United States Patent
Kumarasamy et al.

(10) Patent No.: US 7,822,858 B2
(45) Date of Patent: Oct. 26, 2010

(54) TECHNIQUES FOR BULK REFRESH OF SESSIONS IN IP NETWORKS

(75) Inventors: Parameswaran Kumarasamy, San Jose, CA (US); Jayesh Chokshi, Cupertino, CA (US); Mohammed Taher Shaikh, Fremont, CA (US); Vinay Pande, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1218 days.

(21) Appl. No.: 11/411,367

(22) Filed: Apr. 26, 2006

(65) Prior Publication Data

US 2007/0253428 A1 Nov. 1, 2007

(51) Int. Cl.
*G06F 15/16* (2006.01)

(52) U.S. Cl. ............... 709/227; 709/229; 709/226; 709/249; 709/207; 709/245; 709/205; 709/228; 370/352; 370/242; 370/328; 370/466; 370/401; 370/389; 370/349; 370/465; 455/434; 455/433; 455/426.1; 379/88.17; 379/88.18

(58) Field of Classification Search ......... 709/226–229, 709/245, 207, 249, 260, 204
See application file for complete search history.

(56) References Cited

U.S. PATENT DOCUMENTS

| | | | |
|---|---|---|---|
| 2006/0089966 A1 * | 4/2006 | Stille et al. | 709/203 |
| 2006/0212589 A1 * | 9/2006 | Hayer et al. | 709/229 |
| 2007/0043876 A1 * | 2/2007 | Varga et al. | 709/245 |

OTHER PUBLICATIONS

Donovan, S., et al. "Session Timers in the Session Initiation Protocol (SIP)", ftp://ftp.rfc-editor.org/in-notes/rfc4028.txt.

* cited by examiner

*Primary Examiner*—Jude J Jean Gilles
(74) *Attorney, Agent, or Firm*—Trellis IP Law Group, PC

(57) ABSTRACT

Techniques for providing a bulk refresh of sessions in a network are provided. A plurality of session identifiers for sessions that were created are determined. These session identifiers may be included in a bulk refresh message. The bulk refresh message is sent to a device configured to determine if sessions associated with the plurality of session identifiers are active or inactive. The device then sends a response to the refresh requestor. The response can be used to determine which sessions are active or inactive. After the determination, actions can be taken in order to clear the hanging session. For example, the session may be torn down or a BYE message may be sent to end the session on a peer device.

30 Claims, 6 Drawing Sheets

400

Sent:
INVITE sip:bob@biloxi.example.com SIP/2.0
Via: SIP/2.0/UDP pc33.atlanta.example.com;branch=z9hG4bKnas
Supported: timer, replaces, bulk-refresh
Max-Forwards: 70
To: Bob <sip:bob@biloxi.example.com>
From: Alice <sip:alice@atlanta.example.com>;tag=1928301774
Call-ID: a84b4c76e66710
CSeq: 314159 INVITE
Contact: <sip:alice@pc33.atlanta.example.com>
Content-Type: application/sdp
Content-Length: 142

[Actual SDP not shown here]

406

Received:
SIP/2.0 200 OK
Via: SIP/2.0/UDP pc33.atlanta.example.com;branch=z9hG4bKnas
Supported: replaces, bulk-refresh
To: Bob <sip:bob@biloxi.example.com>;tag=9as888nd
From: Alice <sip:alice@atlanta.example.com>;tag=1928301774
Call-ID: a84b4c76e66710
CSeq: 314161 INVITE
Contact: <sip:bob@192.0.2.4>
Content-Type: application/sdp
Content-Length: 142

[Actual SDP not shown here]

Sent:
OPTIONS sip:biloxi.example.com:5060 SIP/2.0
Via: SIP/2.0/UDP 15.6.39.10:5060;branch=z9hG4bKDC26C5
From: <sip:15.6.39.10>;tag=575C948-1075
To: <sip:xyz.lunapark.com>
Call-ID: 896B3813-66B911D6-81D6A8CE-F69B146A@15.6.39.10
CSeq: 101 OPTIONS
Max-Forwards: 70
Contact: <sip:15.6.39.10:5060>
Event: refresh-summary
Content-Type: text/plain
Content-Length: xxx Call-ID: 896B3814-66B911D6-81D6A8CE-F69B146A@15.6.39.10
Call-ID: 896B3815-66B911D6-81D6A8CE-F69B146B@15.6.39.10
Call-ID: 896B3816-66B911D6-81D6A8CE-F69B146C@15.6.39.10
Call-ID: 896B3817-66B911D6-81D6A8CE-F69B146D@15.6.39.10
Call-ID: 896B3818-66B911D6-81D6A8CE-F69B146E@15.6.39.10
Call-ID: 896B3819-66B911D6-81D6A8CE-F69B146F@15.6.39.10
Call-ID: 896B3820-66B911D6-81D6A8CE-F69B146G@15.6.39.10
Call-ID: 896B3821-66B911D6-81D6A8CE-F69B146H@15.6.39.10

*Fig. 5A*

Received:
SIP/2.0 200 OK
Via: SIP/2.0/UDP 15.6.39.10:5060;branch=z9hG4bKDC26C5
From: <sip:15.6.39.10>;tag=575C948-1075
To: <sip:xyz.lunapark.com>;tag=67895634-1234
Call-ID: 896B3813-66B911D6-81D6A8CE-F69B146A@15.6.39.10
CSeq: 101 OPTIONS
Contact: <sip:15.6.39.10:5060>
Event: refresh-summary
Content-Type: text/plain
Content-Length: 0

*Fig. 5B*

Sent:
OPTIONS sip:biloxi.example.com:5060 SIP/2.0
Via: SIP/2.0/UDP 15.6.39.10:5060;branch=z9hG4bKDC26C5
From: <sip:15.6.39.10>;tag=575C948-1075
To: <sip:xyz.lunapark.com>
Call-ID: 896B3813-66B911D6-81D6A8CE-F69B146A@15.6.39.10
CSeq: 101 OPTIONS
Max-Forwards: 70
Contact: <sip:15.6.39.10:5060>
Event: refresh-summary
Content-Type: text/plain
Content-Length: xxx Call-ID: 896B3814-66B911D6-81D6A8CE-F69B146A@15.6.39.10
Call-ID: 896B3815-66B911D6-81D6A8CE-F69B146B@15.6.39.10
Call-ID: 896B3816-66B911D6-81D6A8CE-F69B146C@15.6.39.10
Call-ID: 896B3817-66B911D6-81D6A8CE-F69B146D@15.6.39.10
Call-ID: 896B3818-66B911D6-81D6A8CE-F69B146E@15.6.39.10
Call-ID: 896B3819-66B911D6-81D6A8CE-F69B146F@15.6.39.10
Call-ID: 896B3820-66B911D6-81D6A8CE-F69B146G@15.6.39.10
Call-ID: 896B3821-66B911D6-81D6A8CE-F69B146H@15.6.39.10

*Fig. 6A*

Received:
SIP/2.0 200 OK
Via: SIP/2.0/UDP 15.6.39.10:5060;branch=z9hG4bKDC26C5
From: <sip:15.6.39.10>;tag=575C948-1075
To: <sip:xyz.lunapark.com>;tag=67895634-1234
Call-ID: 896B3813-66B911D6-81D6A8CE-F69B146A@15.6.39.10
CSeq: 101 OPTIONS
Contact: <sip:15.6.39.10:5060>
Event: refresh-summary
Content-Type: text/plain
Content-Length: xxx Call-ID: 896B3820-66B911D6-81D6A8CE-F69B146G15.6.39.10

*Fig. 6B*

TECHNIQUES FOR BULK REFRESH OF SESSIONS IN IP NETWORKS

BACKGROUND OF THE INVENTION

Embodiments of the present invention generally relate to telecommunications and more specifically to techniques for providing a bulk refresh of sessions in an IP network.

Voice over internet protocol (VoIP) has become popular and prevalent for communications. When a communication between two peers occurs, a session is created for the communication. As VoIP networks evolve into large end-to-end networks, messages, such as session initiation protocol (SIP) messages, increasingly have to traverse a larger number of intermediate hops before reaching a final endpoint. With unpredictable IP network delays and packet loss, the chances of losing the SIP messages are high. This occurs especially if User Datagram Protocol (UDP) or any other unreliable protocol is used to send messages.

When a SIP message is lost, this may lead to a hanging SIP session. A hanging SIP session is a session on one side of a communication that a peer thinks is active but is not active on the other side.

To address the issue of hanging SIP sessions, session refresh mechanisms are used. The refresh mechanisms use additional messaging to periodically validate the existence of SIP sessions between two peers. The validation determines if a SIP session is active on a peer. If the SIP session is not active, then it may be removed or terminated from a peer on the other side of the communication.

The method of refreshing the SIP sessions is performed on an individual session basis. For example, messaging for each individual session is performed to refresh each session. If there are 1000 sessions, then these 1000 sessions must be refreshed with 1000 separate messages. To compound the problem, multiple messages usually need to be sent to refresh each session. This puts additional load on the refresher requesting the session request and the refreshes who is performing the refreshing of the sessions.

BRIEF DESCRIPTION OF THE DRAWINGS

FIGS. 4A and 4B show an example of messages that may be sent in a negotiation according to one embodiment of the present invention.

FIGS. 5A and 5B show a message exchange for the bulk refresh mechanism according to one embodiment of the present invention.

FIGS. 6A and 6B depict a second message exchange according to one embodiment of the present invention.

DETAILED DESCRIPTION OF EMBODIMENTS OF THE INVENTION

In one embodiment, techniques for providing a bulk refresh of sessions in a network are provided. A plurality of session identifiers for sessions that were created are determined. These session identifiers may be included in a bulk refresh message. The bulk refresh message is sent to a device configured to determine if sessions associated with the plurality of session identifiers are active or inactive. The device then sends a response to the refresh requestor. The response can be used to determine which sessions are active or inactive. After the determination, actions can be taken in order to clear the hanging session. For example, the session may be torn down or a BYE message may be sent to end the session on a peer device.

Figure 1:
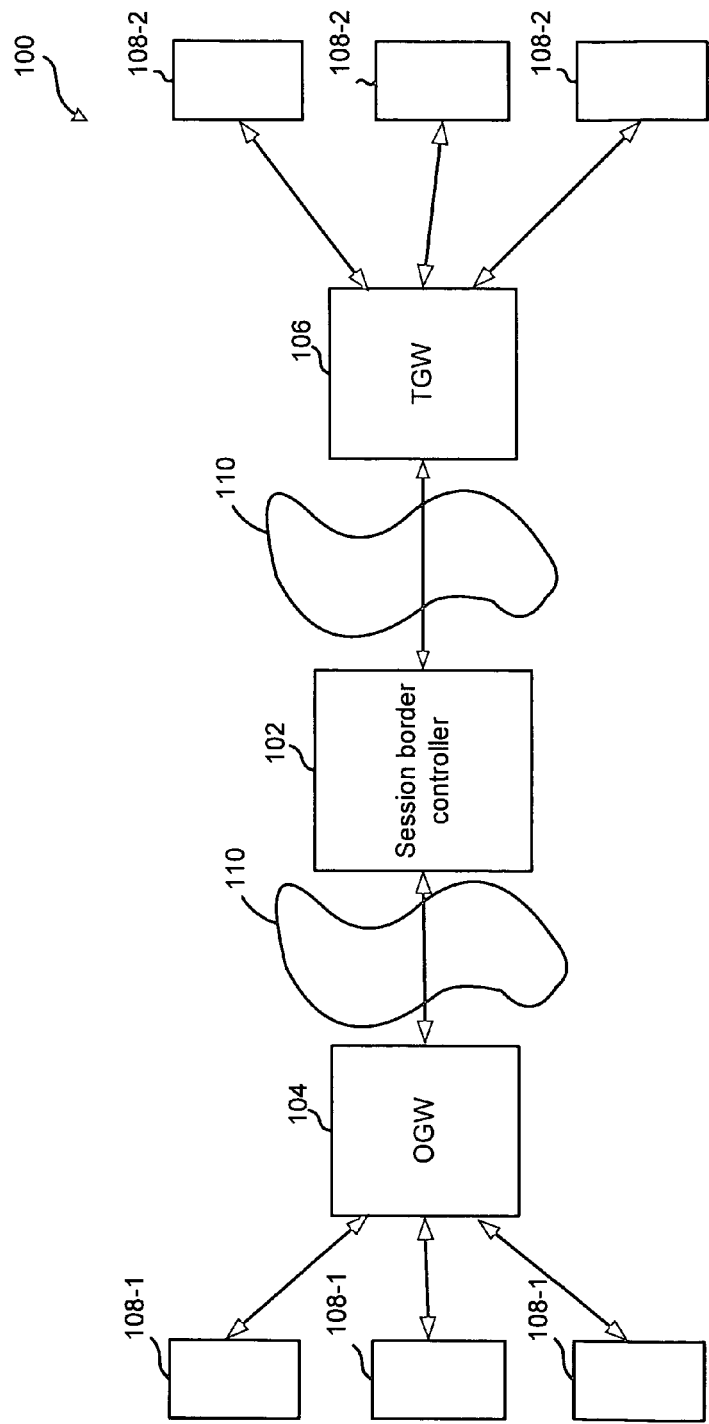
FIG. 1 depicts a system for providing a bulk refresh of sessions according to one embodiment of the present invention.

FIG. 1 depicts a system 100 for providing a bulk refresh of sessions according to one embodiment of the present invention. As shown, a session border controller (SBC) 102, originating gateway (OGW) 104, terminating gateway (TGW) 106, end devices 108, and network 110 are provided. Communications may be routed between a specific end device 108-1 and a specific end device 108-2. A session is created for the communications that are routed between originating gateway 104 and terminating gateway 106 for end device 108-1 and end device 108-2. Many sessions may be created by different end devices 108-1 and 108-2 to communicate. Session Border Controller 102 keeps track of which set of sessions are established between originating gateway 104 and terminating gateway 106.

End devices 108 may be any devices that can participate in a communication. For example, end devices may be IP telephones, public switch telephone network (PSTN) devices, computers, instant message clients, soft phones, or any other devices that can participate in a communication.

Originating gateway 104 may be any network device configured to manage communications with end devices 108-1. In one embodiment, gateway 104 manages a set of end devices 108. Originating gateway 104 may be the gateway that originates a communication.

Terminating gateway 106 may be any network device configured to manage communications with end devices 108-2. Terminating gateway 106 may be the gateway that receives a communication from originating gateway 104. Terminating gateway 106 may then send a communication to an end device 108-2. Although originating gateway 104 and terminating gateway 106 are referred to as "originating" and "terminating", it will be understood that communications may be full duplex in nature. Thus, originating gateway 104 and terminating gateway 106 may originate and terminate communications.

Session border controller 102 is a network device configured to sit in between communications between originating gateway 104 and terminating gateway 106. Session border controller 102 keeps track of which set of sessions are established between originating gateway 104 and terminating gateway 106. Session border controller 102 may include SIP proxies, IP-PBXs, media gateways, soft switches, Back-To-Back User Agents (B2BUAs), etc.

Network 110 may be any network. For example, network 110 may be an IP network. Session initiation protocol (SIP) may be used to send SIP messages between originating gateway 104 and terminating gateway 106. Although SIP is described, it will be understood that other VoIP protocols may be appreciated.

As SIP sessions are created, session border controller stores a session identifier. The session may be active on both the originating gateway 104 and the terminating gateway 106. However, at some point, a session at originating gateway 104 and/or terminating gateway 106 may become inactive on one gateway but not the other. The session may be considered hanging in this case. A hanging session is where one side or both the sides of a communication think that a session is active but the session is inactive on one side or both the sides of the communication. For example, terminating gateway 106 may think that a session is active. However, the session may be inactive on originating gateway 104. The session may become inactive for different reasons. For example, a session may time-out and become inactive after a certain period of time. If signaling and/or media packets are lost in a communication, this may cause a time-out.

When hanging sessions occur, actions should be taken to clear the session. For example, a BYE message should be sent by terminating gateway 106 to end the session or the session can be forcibly torn down. This clears the hanging session from terminating gateway 106. Similarly other devices like session border controller 102 and originating gateway 104 can initiate a session clean-up.

Accordingly, embodiments of the present invention perform a bulk session refresh. A negotiation may take place to determine if a bulk refresh can be performed. For example, SIP INVITE and 200 OK messages may be sent to determine if originating gateway 104 and session border controller 102 support the bulk refresh. A message that includes a plurality of session identifiers for multiple sessions is sent to originating gateway 104. Thus, individual messages are not sent for refreshing each session separately. Originating gateway 104 uses the plurality of session identifiers to determine which sessions are active or inactive and then sends a message back to session border controller 102. The message includes information that can be used to determine which sessions are active and/or inactive.

Session border controller 102 then determines which sessions are indeed active and inactive for the message. Thus, less messaging is used to determine which sessions to refresh. Although it is described that a bulk refresh is performed with originating gateway 104, it will be understood that the bulk refresh may be performed with terminating gateway 106 also. Similarly, originating gateway 104 and terminating gateway 106 can also initiate a bulk refresh of sessions.

After it is determined which sessions are inactive, actions may be taken to clear the inactive sessions. For example, a BYE may be sent to terminating gateway 106 to end an inactive session. Also, terminating gateway 106 may be notified to tear down an inactive session.

Although only one originating gateway 104 is shown, it will be recognized that session border controller 102 may be coupled to multiple originating gateways 104. Thus, session border controller 102 may have to refresh sessions at multiple originating gateways 104 separately. Thus, conventionally, the amount of messages needed to refresh sessions individually were multiplied by the number gateways serviced by session border controller 104. Accordingly, embodiments of the present invention may be very useful in lowering a number of messages needed to refresh sessions on multiple originating gateways 104.

Figure 2:
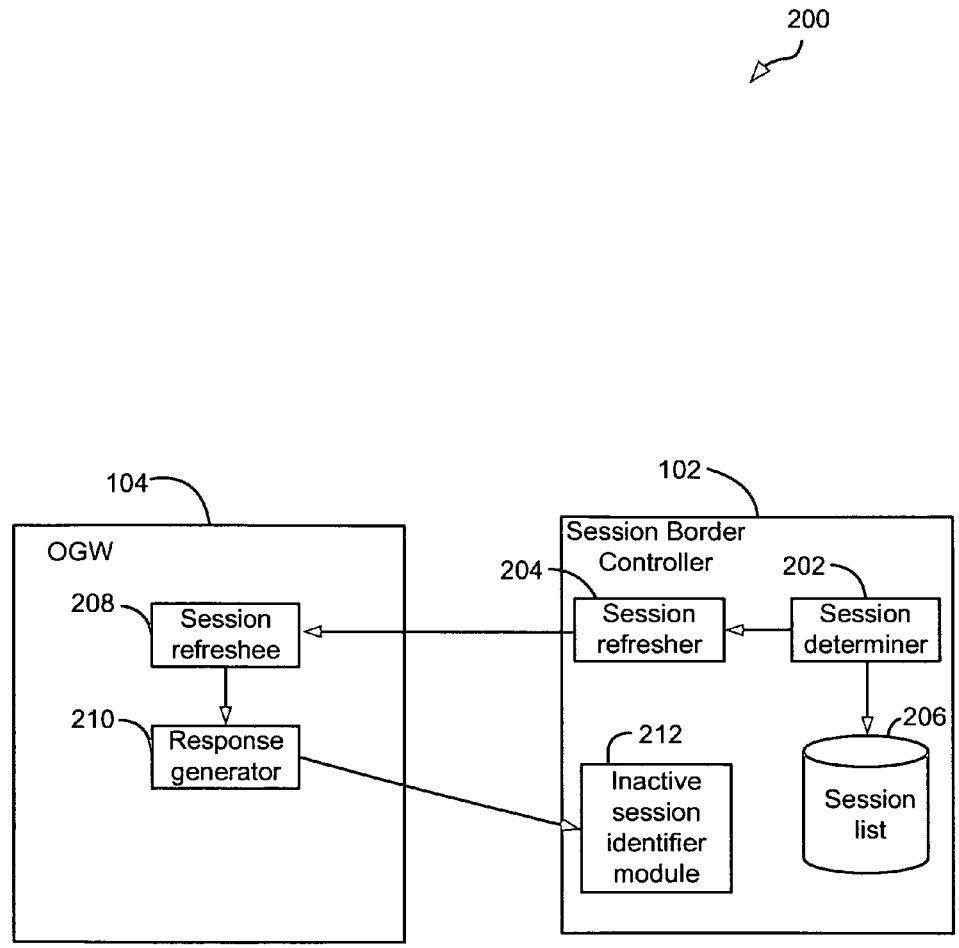
FIG. 2 depicts a more detailed embodiment of system according to embodiments of the present invention.

FIG. 2 depicts a more detailed embodiment of system 100 according to embodiments of the present invention. As shown, session border controller 102 and originating gateway 104 are provided. For discussion purposes, the communication is assumed to be between session border controller 102 and originating gateway 104. However, terminating gateway 106 may include the same components as described with respect to originating gateway 104. Also, although session border controller 102 is shown as initiating the bulk refresh, it will be understood that other devices in system 100 may initiate the bulk refresh, such as originating gateway 104.

As shown, session border controller 102 includes a session identifier 202, a session refresher 204, and a session list 206. Session identifier 202 is configured to determine sessions that have been created between originating gateway 104 and terminating gateway 106. Session identifiers may have been stored in session list 206 when the sessions were created.

When the session identifiers are determined, session refresher 204 is configured to generate a bulk refresh message. In one embodiment, if the number of session identifiers is large, multiple bulk refresh messages may be sent. For example, a subset of the session identifiers may be sent in multiple messages. However, at least two or more session identifiers are sent in a bulk refresh message. These few extra messages are still a lot less than the message sent when refreshing sessions individually. In one embodiment, a message may be a SIP OPTIONS message. The session identifiers may be included in the body of the OPTIONS message. For example, the session identifiers may be included using the content-type "text/plain" option.

In one embodiment, the OPTIONS message is sent out of dialogue. Out of dialogue means that it is not sent in a session that is being refreshed. Rather, it is sent in a new session. If the OPTIONS message is sent in a session that is being refreshed, it is possible that this session is not active. Thus, the bulk refresh message may not be received. In one embodiment, the out of dialogue OPTIONS message may be sent as an intelligent multiple session ping. It will be recognized that the bulk refresh message may also be sent in a session being refreshed. However, checks to determine whether the message is received may be performed or the message may be sent multiple times until a response is received.

A session refreshee 208 receives the bulk refresh message from session refresher 204. Session refreshee 208 is configured to determine which sessions are active or inactive for the plurality of session identifiers.

Response generator 210 then takes the determination of active or inactive sessions and generates a response for session border controller 102. The response may be used to indicate which sessions are active and/or inactive. In one embodiment, a 200 OK SIP message is used to send the response. The way that active or inactive sessions are indicated in the response may be different. For example, if all sessions identified in the plurality of session identifiers are active at originating gateway 104, then a message may be sent with nothing in the content section. For example, the content-length of the message may equal zero. This indicates that all sessions are active. If some sessions mentioned in the plurality of session identifiers are inactive, those session identifiers for the inactive sessions may be included in the 200 OK reply. In yet another embodiment, only the active session identifiers may be included in the 200 OK reply. It will be appreciated that many different methods of indicating which sessions are inactive and active may be used.

Response generator 210 then sends the response to session border controller 102. The response may be sent in the same session that was used to send the bulk refresh message.

An inactive session identifier module 212 then determines which sessions in the plurality of session identifiers are inactive. The content of the message may be analyzed to determine which sessions are indicated as inactive.

In one embodiment, session border controller 102 is then configured to take actions to clear any discrepancies for inactive sessions. For example, session border controller 102 may send a BYE message to terminating gateway 106 for the inactive sessions identified. Also, originating gateway 104 can send the BYE message for the inactive sessions. Terminating gateway 106 may also be notified and can end the inactive sessions itself.

Figure 3:
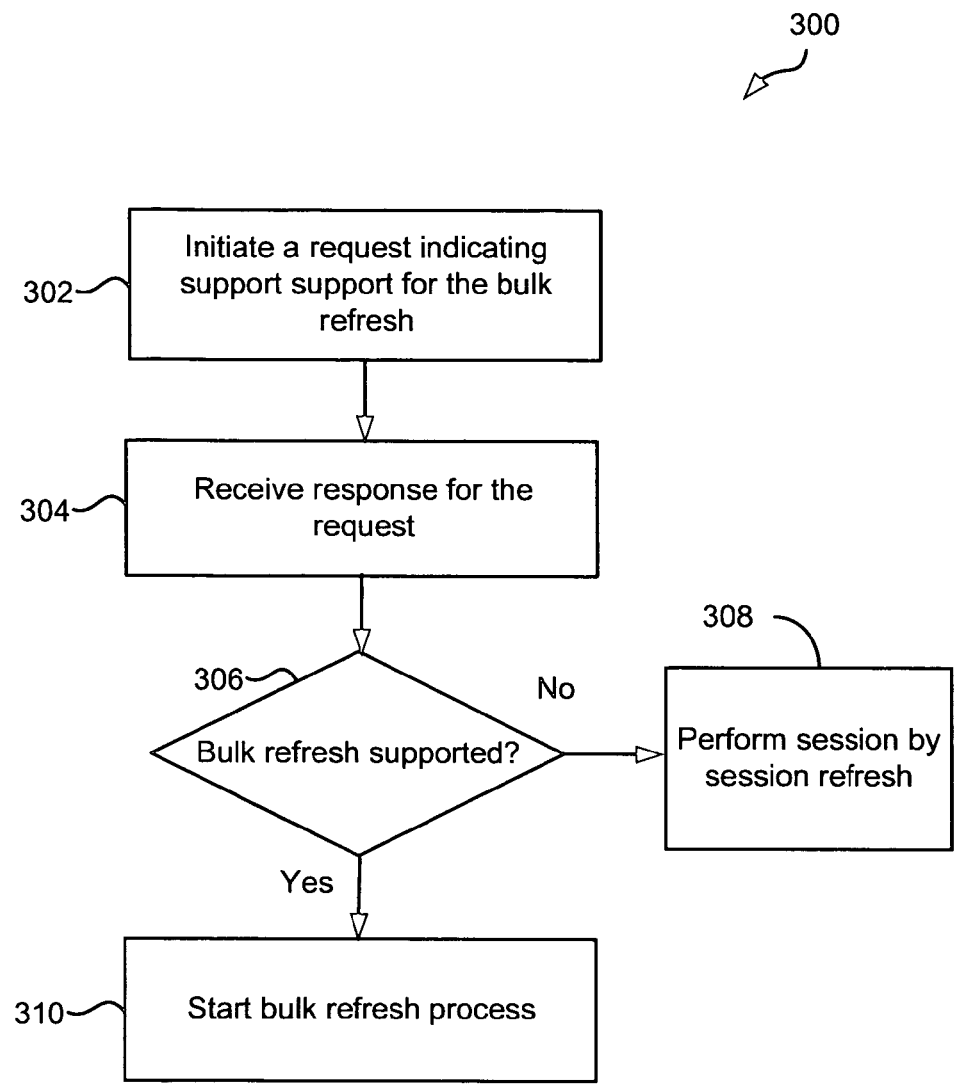
FIG. 3 depicts a simplified flow chart of a negotiation method for determining if a bulk refresh should be used according to one embodiment of the present invention.

In some cases, devices may not support the bulk session refresh method. Thus, a negotiation is provided to determine if the bulk refresh can be performed. FIG. 3 depicts a simplified flow chart 300 of a negotiation method for determining if a bulk refresh should be used according to one embodiment of the present invention.

Step 302 sends a message requesting bulk refresh support. For example, a SIP INVITE message includes a "Supported" header field with an option-tag that indicates that a bulk refresh is requested. The SIP INVITE message may be provided with a supported header field of the new tag "bulk-refresh". This indicates that a device that sent the message supports bulk refresh. In one embodiment, session border controller 102 may send this message.

Step 304 receives a response to the INVITE request. The response may be received at originating gateway 104.

Step 306 determines if the bulk refresh mechanism is supported. If the bulk refresh mechanism is supported, a parameter found in the "Supported" header field of bulk-refresh is copied in a 200 OK message. For example, the tag "bulk-refresh" is copied into the "Supported" header. If the bulk refresh message mechanism is not supported, then the "Supported" header in the 200 OK message does not list the tag "bulk-refresh". It will be understood that other methods of indicating whether the bulk refresh mechanism is supported will be appreciated.

If the bulk refresh mechanism is not supported, then step 308 performs a session-by-session refresh, if supported. This sends individual messages for each session to refresh them individually.

If the bulk refresh mechanism is supported, step 310 starts the bulk refresh process.

FIGS. 4A and 4B show an example of messages that may be sent in a negotiation according to one embodiment of the present invention. As shown in FIG. 4A, a message, such as a SIP INVITE message, is sent. A new tag 402 of "bulk-refresh" is included in message 400. Tag 402 indicates that the bulk refresh mechanism is supported by the sender of the message. The tag may be new in that it is not specified by the standard SIP protocol.

In FIG. 4B, a message 406 is received from the receiver of the message. As shown, a tag 408 of bulk-refresh is included in message 406. This indicates that the bulk refresh mechanism is supported by the peer.

The above messages may be provided in messages sent in a session. For example, messages may be sent to and from Bob and Alice. Bob and Alice may be using end devices 108-1 and 108-2. Message 400 is received at originating gateway 104 and inspected. If the bulk refresh mechanism is supported, the tag is added to a return message 406 from Bob to Alice. Session border controller 102 then inspects message 406 and determines that originating gateway 104 supports the bulk refresh mechanism. Thus, in-session messages sent between end devices 108-1 and 108-2 may be used to determine if the bulk refresh mechanism is supported by originating gateway 104 and session border controller 102.

FIGS. 5A and 5B show a message exchange for the bulk refresh mechanism according to one embodiment of the present invention. As shown in FIG. 5A, a message 502 is sent requesting a bulk refresh. In one embodiment, message 502 is an OPTIONS SIP message that is sent to originating gateway 104 from session border controller 102.

A new tag 504 of "refresh-summary" is included in message 502. The "refresh-summary" tag 504 indicates that this message requests a bulk refresh for a number of session identifiers. The tag may be new in that it is not specified by the standard SIP protocol.

As shown, a session identifier 503 is provided in message 502. Session identifier 503 is the session identifier for this message 502. This is different than the session identifiers found in section 506. In an out-of-dialogue communication, a new session is created using session identifier 503 and message 502 is sent in the session.

As shown, eight session identifiers are provided in section 506. Thus, message 502 is requesting that originating gateway 104 determine if sessions for the eight session identifiers are active or inactive.

FIG. 5B shows a response message 508 according to one embodiment of the present invention. In this embodiment, the sessions for all the session identifiers in message 508 were active. In one embodiment, message 508 is a SIP 200 OK message. As shown, the "Content-Length" 510 is zero. Thus, no information is included in the body of message 508. In one embodiment, this indicates that all sessions for the identifiers in section 506 are active.

FIGS. 6A and 6B depict a second message exchange according to one embodiment of the present invention. As shown, message 502 is sent that includes a tag 504 of refresh-summary. Further, a section 506 includes a plurality of session identifiers.

In FIG. 6B, a response message 604 is received. A tag 504 indicates that this message is a refresh-summary. As shown, session identifier 503 is included in the response message 508.

As shown in section 606, a session identifier is provided in the body of message 604. In one embodiment, this indicates that the session for this session identifier is inactive. In other embodiments, any identifiers in section 606 may indicate that they are for sessions that are active.

Accordingly, the session for the session ID included in section 606 is a session that is deemed inactive by originating gateway 104. Actions can then be taken to remove the inactive session from terminating gateway 106.

Accordingly, standard SIP messages may be used to perform the bulk refresh. The OPTIONS and 200 OK reply are used to determine which sessions are inactive and active. Multiple session identifiers are sent in the message and the bulk refresh is performed using minimal messaging.

Embodiments of the present invention provide many advantages. For example, an efficient way of refreshing multiple SIP sessions between two devices is provided. There is a drastic reduction in the amount of messages built, parsed, and exchanged between devices. This conserves resources (CPU and memory) on the devices involved in the session refresh. Thus, these devices may be able to handle a larger number of simultaneous communications. This directly impacts the network bandwidth use in that fewer messages are exchanged.

Further, standard messages in the SIP protocol may be used to perform the bulk refresh. For example, existing messages are used with new header fields.

Although the invention has been described with respect to specific embodiments thereof, these embodiments are merely illustrative, and not restrictive of the invention. For example, protocols other than SIP may be used. Further, network devices other than gateways and session border controllers may be used.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for providing a bulk refresh of sessions in a network, the method comprising:
   determining a plurality of session identifiers for sessions that were created;

sending a bulk refresh message to a device, the bulk refresh message including two or more of the plurality of session identifiers, wherein the device is configured to refresh sessions associated with the two or more of the plurality of session identifiers to determine if the sessions are active;

receiving a response from the device; and determining, from the response, which sessions are inactive for the two or more of the plurality of session identifiers.

2. The method of claim 1, wherein the bulk refresh message comprises an OPTIONS SIP message.

3. The method of claim 2, wherein the OPTIONS SIP message is sent in a session not included in the sessions for the two or more of the plurality of session identifiers.

4. The method of claim 2, wherein the response comprises a 200 OK SIP message.

5. The method of claim 1, wherein the response indicates which of the two or more of the plurality of session identifiers are associated with active sessions or the response indicates which of the two or more of the plurality of session identifiers are associated with inactive sessions.

6. The method of claim 1, further comprising performing an action to refresh a session for a session identifier that is determined to be inactive.

7. The method of claim 1, further comprising determining if the device supports the bulk refresh of sessions.

8. A method for providing a bulk refresh of sessions in a network, the method comprising:

receiving a bulk refresh message from a requester, the bulk refresh message including a plurality of session identifiers for sessions that were created;

determining if sessions associated with the plurality of session identifiers are inactive; and sending a response to the requester, the response usable to determine which sessions are inactive for the plurality of session identifiers.

9. The method of claim 8, wherein the bulk refresh message comprises an OPTIONS SIP message.

10. The method of claim 9, wherein the OPTIONS SIP message is received in a session not included in the sessions for the plurality of session identifiers.

11. The method of claim 9, wherein the response comprises a 200 OK SIP message.

12. The method of claim 8, wherein the response indicates which of the plurality of session identifiers are associated with active sessions or the response indicates which of the plurality of session identifiers are associated with inactive sessions.

13. The method of claim 8, further comprising performing an action to refresh a session for a session identifier that is determined to be inactive.

14. The method of claim 8, further comprising:

receiving a first message indicating support for the bulk refresh of sessions from the requester; and sending a second message indicating support for the bulk refresh of sessions to the requester.

15. A network device configured to provide a bulk refresh of sessions in a network, the network device comprising:

a session determiner configured to determine a plurality of session identifiers for sessions that were created;

a session refresher configured to send a bulk refresh message to a device, the bulk refresh message including two or more of the plurality of session identifiers, wherein the device is configured to refresh sessions associated with the two or more of the plurality of session identifiers to determine if the sessions are active; and a receiver configured to receive a response from the device; and an inactive session identifier module configured to determine, from the response, which sessions are inactive for the two or more of the plurality of session identifiers.

16. The network device of claim 15, wherein the bulk refresh message comprises an OPTIONS SIP message.

17. The network device of claim 16, wherein the OPTIONS SIP message is sent in a session not included in the sessions for the two or more of the plurality of session identifiers.

18. The network device of claim 16, wherein the response comprises a 200 OK SIP message.

19. The network device of claim 15, wherein the response indicates which of the two or more of the plurality of session identifiers are associated with active sessions or the response indicates which of the two or more of the plurality of session identifiers are associated with inactive sessions.

20. The network device of claim 15, wherein the session refresher is configured to perform an action to refresh a session for a session identifier that is determined to be inactive.

21. The network device of claim 15, further comprising a negotiator configured to determine if the device supports the bulk refresh of sessions.

22. A network device configured to provide a bulk refresh of sessions in a network, the network device comprising:

a session refreshee configured to receive a bulk refresh message from a requester, the bulk refresh message including a plurality of session identifiers for sessions that were created and configured to determine if sessions associated with the plurality of session identifiers are inactive; and a response generator configured to send a response to the requester, the response usable to determine which sessions are inactive for the plurality of session identifiers.

23. The network device of claim 22, wherein the bulk refresh message comprises an OPTIONS SIP message.

24. The network device of claim 23, wherein the OPTIONS SIP message is received in a session not included in the sessions for the plurality of session identifiers.

25. The network device of claim 23, wherein the response comprises a 200 OK SIP message.

26. The network device of claim 23, wherein the response indicates which of the plurality of session identifiers are associated with active sessions or the response indicates which of the plurality of session identifiers are associated with inactive sessions.

27. The network device of claim 23, wherein the session refreshee is configured to perform an action to refresh a session for a session identifier that is determined to be inactive.

28. The network device of claim 23, further comprising:

a negotiator configured to receive a first message indicating support for the bulk refresh of sessions from the requester and configured to send a second message indicating support for the bulk refresh of sessions to the requester.

29. A network device configured to provide a bulk refresh of sessions in a network, the network device comprising:

means for receiving a bulk refresh message from a requester, the bulk refresh message including a plurality of session identifiers for sessions that were created;

means for determining if sessions associated with the plurality of session identifiers are inactive; and means for sending a response to the requester, the response usable to determine which sessions are inactive for the plurality of session identifiers.

30. A network device configured to provide a bulk refresh of sessions in a network, the network device comprising:

means for determining a plurality of session identifiers for sessions that were created;

means for sending a bulk refresh message to a device, the bulk refresh message including two or more of the plurality of session identifiers, wherein the device is configured to refresh sessions associated with the two or more of the plurality of session identifiers to determine if the sessions are active;

means for receiving a response from the device; and means for determining, from the response, which sessions are inactive for the two or more of the plurality of session identifiers.

* * * * *